(12) United States Patent
Schroeder

(10) Patent No.: US 6,687,715 B2
(45) Date of Patent: Feb. 3, 2004

(54) PARALLEL LOOKUPS THAT KEEP ORDER

(75) Inventor: Jacob Schroeder, Lyngby (DK)

(73) Assignee: Intel Corporation, Santa Clara, CA (US)

(*) Notice: Subject to any disclaimer, the term of this patent is extended or adjusted under 35 U.S.C. 154(b) by 299 days.

(21) Appl. No.: 09/894,348

(22) Filed: Jun. 28, 2001

(65) Prior Publication Data

US 2003/0004921 A1 Jan. 2, 2003

(51) Int. Cl.[7] .............................................. G06F 17/00
(52) U.S. Cl. ....................... 707/200; 707/101; 711/100; 709/200
(58) Field of Search ....................... 707/1–10, 200–206, 707/100–104.1; 711/100–116; 709/200–211

(56) References Cited

U.S. PATENT DOCUMENTS 6,499,028 B1 * 12/2002 Brock et al. .................... 707/4
6,557,091 B2 * 4/2003 Houldsworth ............... 707/206
6,564,217 B2 * 5/2003 Bunney et al. ............. 707/200

OTHER PUBLICATIONS

Chaddha et al., A frame–work for live multicast of video streams over the Internet, Image Processing, 1996, Proceedings, International Conference on, vol. 1, Sep. 16–19, 1996, pp. 1–4.*

Dudgeon et al., Real time processing of multiple input multiple output systems using crosscut memory, Southeastcon '89, Proceedings, Energy and Information Technologies in the Southeast, IEEE, Apr. 9–12, 1989, pp. 1352–1355, vol. 3.*

Chang et al., Efficient IP routing table VLSI design for multigigabit routers, Circuits and Systems, 2002, ISCAS 2002, IEE International Symposium on, vol. 2, May 26–29, 2002, pp. II–776 to II–779.*

* cited by examiner

Primary Examiner—David Jung
(74) Attorney, Agent, or Firm—Pillsbury Winthrop LLP

(57) ABSTRACT

A key lookup system to look up keys associated with a plurality of frames of data includes a key source device that provides source keys to the system. A memory stores data keys and data associated therewith. A plurality of lookup engines searches for the data keys in the memory that are identical to the source keys. A Content Addressable Memory (CAM) stores a copy of a source key being searched for by one of the plurality of lookup engines. A CAM check device to determine whether a key identical to the source key is located in the CAM. A key insertion device copies the source key into the CAM and into one of the plurality of lookup engines if the key identical to the source key is not found in the CAM.

18 Claims, 6 Drawing Sheets

PARALLEL LOOKUPS THAT KEEP ORDER

BACKGROUND OF THE INVENTION

1. Field of the Invention

The present invention generally relates to retrieval of data records. More specifically, the present invention relates to a system, method and apparatus for performing parallel lookups of data records each associated with a frame in a stream of frames, where the lookups keep the order of frames accessing the same data records.

2. Discussion of the Related Art

In networking applications, frames of data are sent through a network. The frames may contain data and reference additional data. Networking applications often utilize Transmission Control Protocol (TCP) to transmit and receive the frames. Frames are packets of information that may be transferred on a network, such as a computer network.

A single device in a TCP protocol implementation can have many "conversations" (TCP connections) with other devices occurring simultaneously. When a device on the network receives a frame, a conversation-identifier is extracted from IP (Internet Protocol) and TCP headers in the frame. The conversation-identifier may be a "key." A key is piece or data, or code, that references a section of data. For example, a frame may be sent with the key "1010". The key "1010" may reference a "status record" for one of the TCP conversations, for example, in a memory. The status record is used by the TCP protocol to process the frame.

There are several methods in the art for locating a key in a memory. For example, a hash-based method has been used. In a hash-based method, there are a set number of look-up engines. Each lookup engine may be a separate program, or a subroutine in a program, for example, that searches for keys in a memory. Many systems in the art utilize more than one lookup engine to search for keys in the memory. The systems typically allocate keys to one of the plurality of lookup engines based upon certain calculations. For example, the hashing method creates a hash value for each key and, based upon the hash value, assigns the key to one of the lookup engines. An exemplary hash-based embodiment may include two lookup engines, A and B, and use keys comprised of four digits. The hash function may be set to sum the digits of the key and send all keys with even-number hash values to lookup engine A and all keys with odd-number hash values to lookup engine B. For example, the sum of the digits in the key "1010" yields an even number, and would therefore be assigned to lookup engine A. The sum of the digits of key "1011" yields an odd number, and would therefore be assigned to lookup engine B. However, a hash-based method is inefficient in a situation where two keys yield the same even (or odd) hash value. In such a situation, one of the lookup engines remains idle while the second key waits until the lookup engine for even hash values locates the first key. Then, the second key may be allocated to the even hash value lookup engine.

Another method for finding keys utilizes a distribution calculation in link aggregation. The distribution calculation in link aggregation is similar to the hash-based method, except that keys for frames are distributed to a number of network links, rather than to a number of lookup engines. The distribution calculation suffers from shortcomings similar to those of the hash-based method, because the system once again searches for the keys based upon the results of a calculation.

The order of processing of frames may matter, for example, in situations where two frames have the same key, and therefore access the same set of data in the memory. If the data is subject to change by virtue of it being accessed, then the first frame must be processed before the second frame is processed.

The order of processing of frames may also matter if a routing protocol is being used that requires frames to be processed in the order in which they are received. An additional reason why the order of processing of the frames may matter is because TCP processing of frames is faster/better when frames for a given conversation are processed by a device in the same order in which that they were generated by the other device. Usually the network does not reorder frames, so by processing frames in the order they are received, they are thereby usually processed in the order they were generated.

In many embodiments in the art, lookups typically take a constant amount of time. The lookups ordinarily complete in the order in which they were initiated, so no specific action has to be taken to ensure the order. However, a problem with this type of lookup is that the usable lookup engines are limited because they always have to use the same low number of memory access to perform the lookup. In another method where the order matters, lookups may take a variable amount of time. However, in the current state of the art, such lookups are performed one-at-a-time.

Accordingly, the systems in the prior art are inefficient in looking up frames where the order of the lookups matters. Prior systems either utilize multiple lookups engines that each search for a set length of time, or search for a variable length of time using one lookup engine at a time. Therefore, systems in the prior art cannot perform multiple lookups for variable lengths of time simultaneously.

DETAILED DESCRIPTION

An embodiment of the present invention processes a series of frames of data. The embodiment extracts a key from each frame and utilizes a series of lookup engines to search for the keys in a memory. Such an embodiment allocates keys in an improved manner among a plurality of lookup engines, and keeps the order of frames having the same key.

Figure 1:
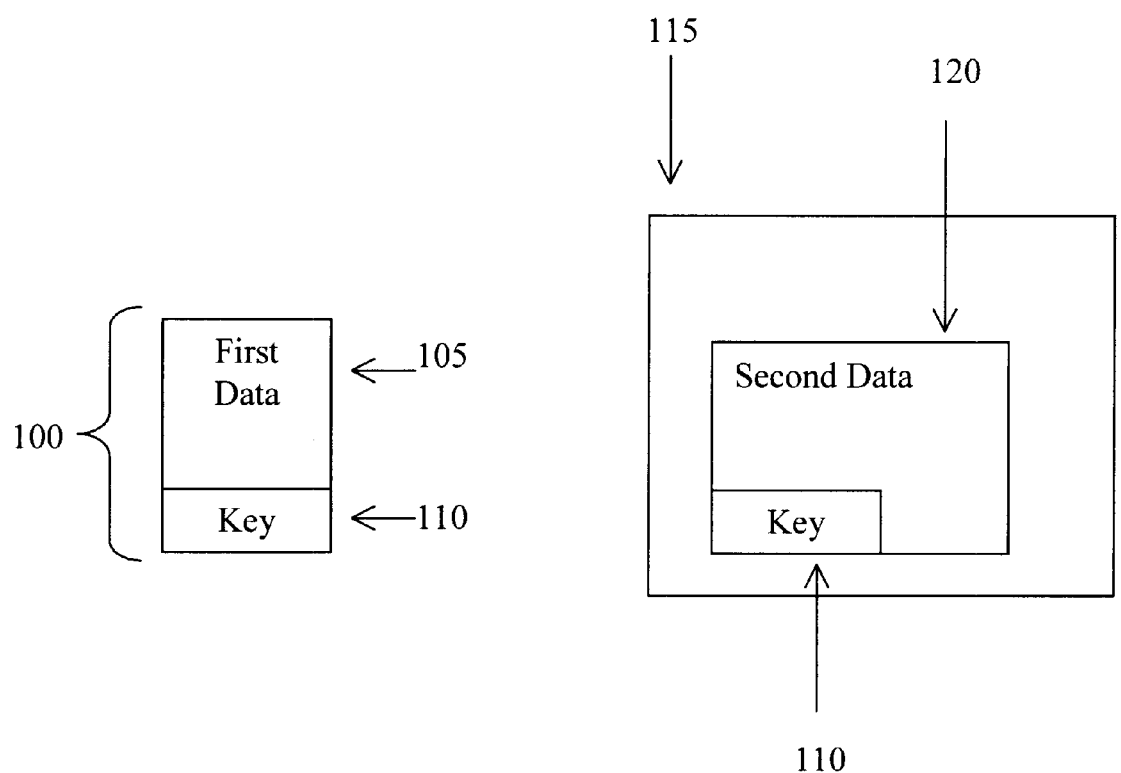
FIG. 1 illustrates a key in a frame of data according to an embodiment of the present invention.

FIG. 1 illustrates a key in a frame of data according to an embodiment of the present invention. A frame 100 is a packet of information that is transferred on a network, such as a computer network. In networking applications, devices on the network often transmit data with other devices on the network, or with other device on the Internet, for example, via Transmission Control Protocol (TCP). Frames 100 may contain data and reference additional data. Networking applications often utilize Transmission Control Protocol (TCP) to transmit and receive frames 100.

A single TCP protocol implementation can have many "conversations" (TCP connections) simultaneously occurring. When a device on the network receives a frame 100, a conversation-identifier is extracted from IP (Internet Protocol) and TCP headers in the frame 100. The conversation-identifier may be a "key" 110. A key 110 is piece or data, or code, that references a section of data. For example, a frame 100 may be sent with the key "1010". The key 110 "1010" may reference a "status record" for one of the TCP conversations, for example, in a memory. The status record is used by the TCP protocol to process the frame 100.

As shown in FIG. 1, the frame 100 includes a first data 105. The first data 105 may include a text file, a record, or the like. The frame 100 also includes a key 110. The key 110 is piece of data, or code, that references a section of data separate from the frame 100. The key 110 may be a number, such as the binary number "1001". The key 110 could also be a number representing an American Standard Code for Information Interchange (ASCII) code. A memory 115, which may be a Random Access Memory (RAM), for example, includes a plurality of data. The memory 115 may be utilized to store keys 110 and data associated therewith. The memory 115 includes a second data 120 portion that is associated with a key 110 that is identical to the key 110 in the frame 100. The second data portion 120 may include settings or an Internet destination location, or may include a status record for a TCP connection, for example. At some point, the second data portion 120 may be retrieved and used to process the frame 100.

The frame 100 has a key 110 associated therewith. As mentioned above, the key 110 is a field in a record that holds unique data that identifies that record from all the other records in the file or database. As an identifier, each key 110 value must be unique in each record.

The key 110 may be utilized, for example, to look up a status record for a TCP connection, or a HyperText Transport Protocol (HTTP) address and a port number, for example. The key 110 may be sent from a device as part of the frame 100. The key 110 may then be used to locate the status of a TCP connection or an HTTP address and port for the frame 100.

Figure 2:
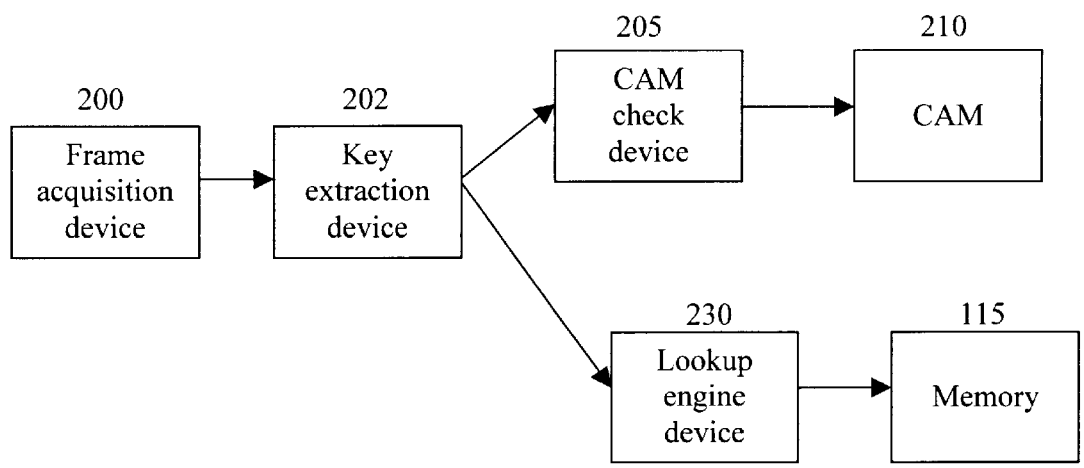
FIG. 2 illustrates a general overview of a parallel lookup system according to an embodiment of the present invention.

FIG. 2 illustrates a general overview of a parallel lookup system according to an embodiment of the present invention. A frame acquisition device 200 is utilized to acquire a frame 100 from a source. The source may be a frame stream. A key extraction device 202 acquires a key 110 from the frame 100. The key 110 is utilized to locate associated data in a memory 115. The system may include a Content Addressable Memory (CAM) 210. A CAM 210 is a type of memory in which data may be accessed by searching for part of the data in the memory. Whereas data may be located in a Random Access Memory (RAM), for example, by searching for a logical address in the RAM, data in a CAM 210 may be located by searching for a known part of the data. A CAM check device 205 checks the CAM 210 to determine whether the key 110 is located in the CAM 210. The CAM 210 is utilized to store keys 110 for data being looked up, or searched for, in the separate memory 115. The memory 115 holds data associated with the keys 110. If an identical key 110 is not already in the CAM check device 210, then this means that the system is not already searching for the same key 110 in the memory 115. In other words, more than one frame 100 may include the same key 110. In such an instance, the key 110 is then placed in the CAM 210 and the system sends a copy of the key to a look-up engine device 230. An embodiment of the look-up engine device 230 includes a plurality of look-up engines. Each look-up engine has a function of searching for the key 110 and the data associated therewith in the memory 115.

Figure 3:
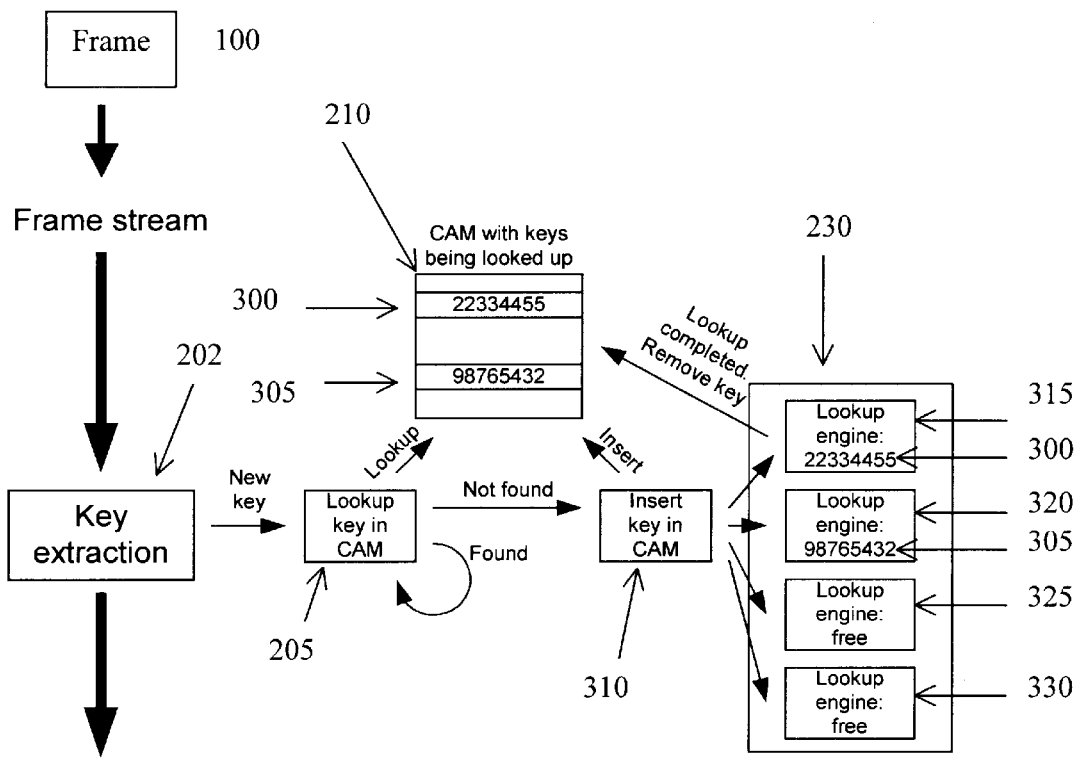
FIG. 3 illustrates an overview of a system according to an embodiment of the present invention.

FIG. 3 illustrates an overview of a system according to an embodiment of the present invention. As illustrated, the system processes a series of frames 100 acquired from a frame stream. The embodiment includes a key extraction device 202, which serves to extract a key 110 from each frame 100 of the frame stream. The CAM 210 is utilized to hold keys 110 for frames 100 extracted from the frame stream. After a key 110 is extracted from a frame 100 in the frame stream, the CAM check device 205 determines whether the key 110 is located in the CAM 210. If it is, then the system is already searching for the same key 110 for a different frame 100. In such a situation, the system waits to place the key 110 into the CAM 210 until the identical key 110 in the CAM 210 has been removed. If the system extracts a key 110 F from a first frame 100, and inserts the key 110 into the CAM 210 and into one of the lookup engines, the system must wait until key 110 F has been found and removed from the CAM 210 before the same key 110 F can be located for a later frame. In other words, the system must search for key 110 F and process the frame 100 associated therewith before the later frame 100 having the same key 110 can be processed. In such a situation, the "order" in which the frames are processed is said to matter.

The order may matter, for example, because the system may change the data stored in the memory 115 that is associated with key 110 F after key 110 F is found. For example, the data referenced by key 110 F may include a status record for a TCP connection. If frame 100 one and frame 100 two both have key 110 F, frame 100 one may be processed with the status record referenced by key 110 F. The status record may then be updated and stored back in the memory 115. Then, when key 110 two is processed, the status record processed for frame 100 two may contain information different than that processed for frame 100 one.

Another reason why the order of processing of the frames may matter is because TCP processing of frames is faster/ better when frames for a given conversation are processed in the same order in which that they were generated by the other computer. Usually the network does not reorder frames, so by processing frames in the order they are received, they are thereby usually processed in the order they were generated.

The order of processing of the frames may also matter because some routing protocols require that frames be processed in the same order in which they are received.

An additional reason why the order of processing of frames may matter is because a computer usually processes frames in the order they have arrived and a chip utilizing TCP to transfer data is supposed to behave as a computer on the network. Although most protocols that are used today that frames can be processed out of order, future protocols may require it.

If the key 110 is not in the CAM 210, then a key insertion device 310 inserts the key 110 into the CAM 210. A copy of the key 110 is then placed in an unused lookup engine of the lookup engine device 230. An embodiment of the look-up engine device 230 includes a plurality of look-up engines.

Each look-up engine has a function of searching in the memory 115 for the key 110 and the data associated therewith.

In the embodiment shown in FIG. 3, two of the lookup engines are searching for keys 110 in the memory. A first lookup engine 315 is searching for a first key 300 "22334455", and a second lookup engine 320 is searching for a second key 305 "98765432" in the memory 115. A third lookup engine 325 and a fourth lookup engine 330 are currently idle. The CAM 210 holds copies of each of the keys 110 being searched. More specifically, the CAM 210 holds the first key 300 "22334455" and the second key 305 "98765432". If a key 110 is subsequently extracted from a frame 100 that is different than the first key 300 and the second key 305, the system places that key 110 in the CAM 210 and sends a copy of the key 110 to the lookup engine device 230, and the key is placed in an idle lookup engine, here, either the third lookup engine 325 or the fourth lookup engine 330.

In the embodiment illustrated in FIG. 3, parallel lookups may be simultaneously performed. In other words, more than one of the lookup engines may search for a key 110 in the memory 115 at a given time. In the embodiment, each of the lookup engines may take a different amount of time to locate a key 110. More specifically, the first lookup engine 315 may take a longer time to locate the first key 300 than the second lookup engine 320 takes to locate the second key 305. The speed at which the entire system looks up keys 110 may be scaled independently of processing or memory speed and latency by adding more lookup engines.

Figure 4:
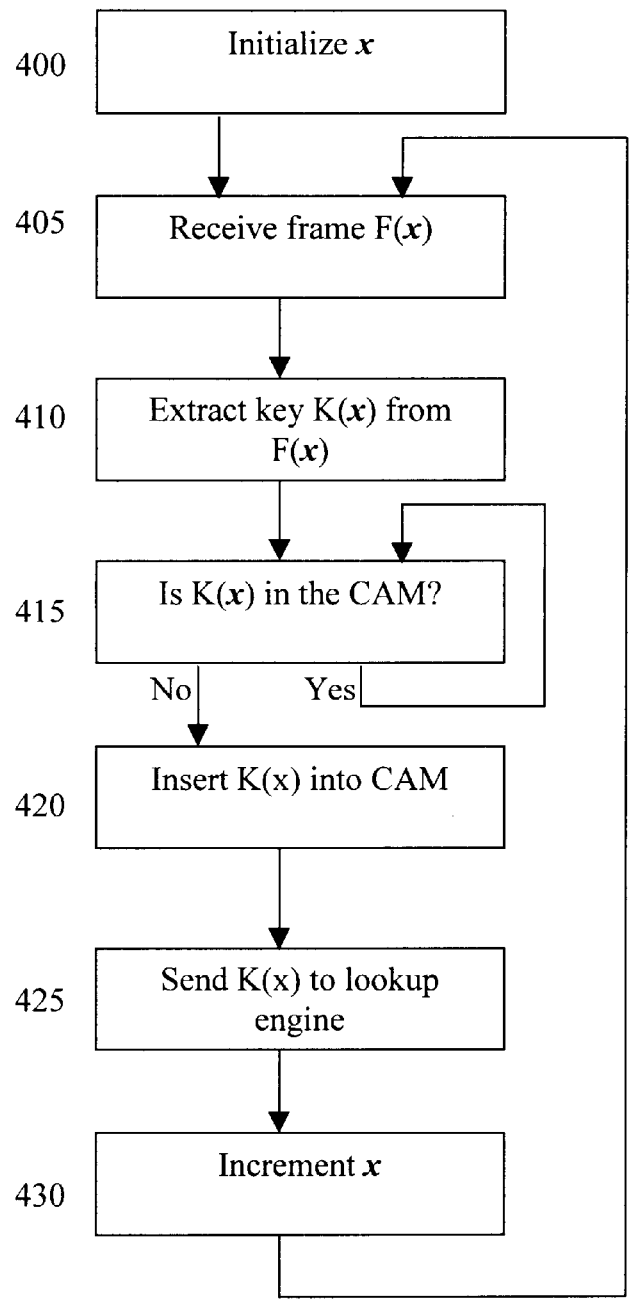
FIG. 4 illustrates a flow chart showing how a system acquires data for each frame from a key in memory according to an embodiment of the present invention.

FIG. 4 illustrates a process by which frames of data are received, and keys 110 are extracted therefrom and it is determined whether the keys 110 are already currently being searched for. The first step in the process is to initialize 400 a counter x. Next, frame F(x) is received 405 from the frame stream. A key 110 K(x) is extracted 410 from frame 100 F(x). As mentioned above, the key 110 is a piece of data, or a code, or the like, associated with the frame 1100. The key 110 is associated with data stored in the memory 115. For example, a frame 100 may contain a personal file for "Joe". The frame 100 may have a key 110 such as the number "1010". The memory 115 may have data associated with "Joe", such as the status for a TCP connection, for example. When the frame 100 is received, the key 110 "1010" is extracted from the frame 100. Next, the process searches for the key 110 "1010" in the memory 115. When the key 110 is found, data associated therewith is taken and utilized to process the frame 100.

After key 110 K(x) has been extracted, the system determines 415 whether key 110 K(x) is in the CAM 210. If it is, the system is currently processing an earlier frame 100 having the same key 110. In such an instance, the system waits until the earlier key 110 K(x) has been removed from the CAM 210 before beginning a search for key 110 K(x) or any later frames 100 in the frame stream. If key 110 K(x) is in the frame 100, then the processing remains at step 415 until key 110 K(x) is out of the CAM 210. If key 110 K(x) is not in the CAM 210, then the system can begin searching for key 110 K(x). Next, the system inserts 420 key 110 K(x) into the CAM 210. Key 110 K(x) remains in the CAM 210 until key 110 K(x) is located in the memory 115. In such an instance, as discussed above, the "order" of the frames is said to matter. At step 425, the processing sends key 110 K(x) to a lookup engine. The processing then increments 430 counter x. Finally, the processing jumps to step 405.

Figure 5:
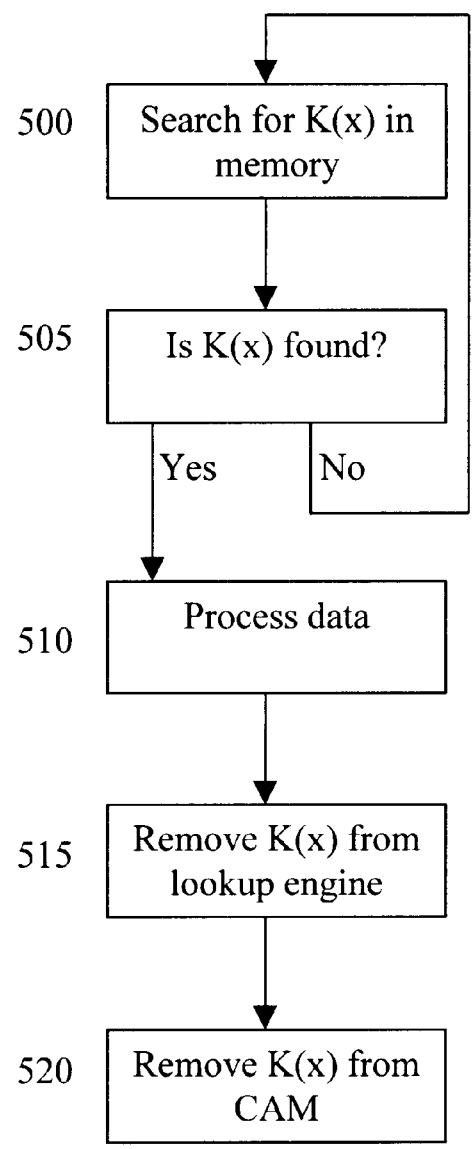
FIG. 5 illustrates processing that occurs while a lookup engine searches for a key according to an embodiment of the present invention.

FIG. 5 illustrates processing that occurs while a lookup engine searches for a key 110 according to an embodiment of the present invention. After the lookup engine has acquired the key 110 K(x), the lookup engine searches 500 for key 110 K(x) in the memory 115. Next, the system determines 505 whether the lookup engine has found key 110 K(x). If key 110 K(x) has been located, then the processing advances to step 510. However, if the key 110 has not been found, processing jumps back to step 500. At step 510, the system processes data for the key 110. More specifically, the system extracts the data associated with the key 110 from the memory 115. Next, key 110 K(x) is removed 515 from the lookup engine. Finally, key 110 K(x) is removed 520 from the CAM 210.

Figure 6:
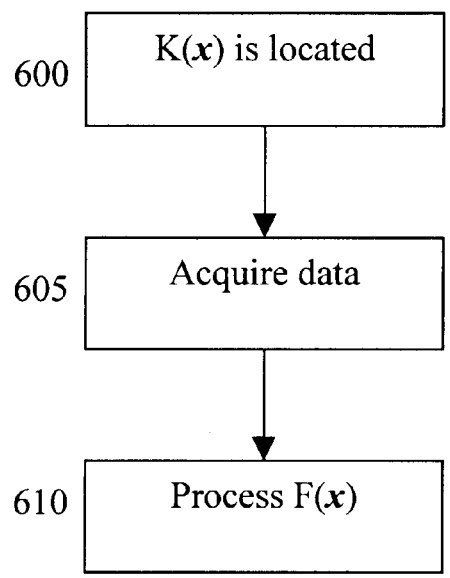
FIG. 6 illustrates data processing that occurs when a key is found in memory according to an embodiment of the present invention.

FIG. 6 illustrates data processing that occurs when a key is found in memory according to an embodiment of the present invention. First, the key 110 K(x) is located 600 in the memory 115. Next, the system acquires 605 the data associated with key 110 K(x). Finally, the system takes the data and uses it to process 610 frame 100 F(x). In an embodiment, the data may be, for example, a status record for a TCP connection.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A key lookup system to look up keys associated with a plurality of frames of data, comprising:

a key source device to provide source keys to the system;

a memory to store data keys and data associated therewith;

a plurality of lookup engines to search for the data keys in the memory that are identical to the source keys;

a Content Addressable Memory (CAM) to store a copy of a source key being searched for by one of the plurality of lookup engines;

a CAM check device to determine whether a key identical to the source key is located in the CAM; and a key insertion device to copy the source key into the CAM and into one of the plurality of lookup engines if the key identical to the source key is not found in the CAM.

2. The key lookup system of claim 1, wherein the key source device extracts each source key from each of the plurality of frames of data.

3. The key lookup system of claim 2, wherein a frame extraction device extracts each of the plurality of frames of data from a stream of frames.

4. The key lookup system of claim 1, wherein the memory is a second CAM.

5. The key lookup system of claim 1, wherein a data extraction device extracts data associated with one of the data keys in the memory after the one of the data keys has been found by one of the plurality of lookup engines.

6. The key lookup system of claim 5, wherein a key removal device removes the key from the CAM that is identical to the one of the data keys found by one of the plurality of lookup engines.

7. A method of finding keys associated with a plurality of frames of data, comprising:

inputting source keys;

searching for data keys in a memory that are identical to the source keys, with a plurality of lookup engines;

storing, in a Content Addressable Memory (CAM), a copy of a source key being searched for by the plurality of lookup engines;

determining whether a key identical to the source key is located in the CAM, wherein if the key identical to the source key is not found in the CAM, the source key is copied into the CAM and into one of the plurality of lookup engines.

8. The method of claim 7, further including extracting each source key from each of the plurality of frames of data.

9. The method of claim 8, further including extracting each of the plurality of frames of data from a stream of frames.

10. The method of claim 7, wherein the memory is a second CAM.

11. The method of claim 7, further including extracting data associated with one of the data keys in the memory after the one of data keys has been found by one of the plurality of lookup engines.

12. The key lookup system of claim 11, further including removing the key from the CAM that is identical to the one of the data keys found by one of the plurality of lookup engines.

13. A key searching device to find, in a memory, keys associated with each of a plurality of frames of data, comprising:

a computer-readable medium; and a computer-readable program code, stored on the computer-readable medium, having instructions to input source keys;

utilize a plurality of lookup engines to search for data keys in a memory that are identical to the source keys;

store, in a Content Addressable Memory (CAM), a copy of a source key being searched for by the plurality of lookup engines;

determine whether a key identical to a source key is located in the CAM, wherein if a key identical to the source key is not found in the CAM, the source key is copied into the CAM and into one of the plurality of lookup engines.

14. The key searching device of claim 13, wherein the code further includes instructions to extract the source key from each of the plurality of frames of data.

15. The key searching device of claim 14, wherein the code further includes instructions to extract each of the plurality of frames of data from a stream of frames.

16. The key searching device of claim 13, wherein the code further includes instructions to use a second CAM as the memory.

17. The key searching device of claim 13, wherein the code further includes instructions to extract data associated with one of the data keys in the memory after the one of the data keys has been found by one of the plurality of lookup engines.

18. The key searching device of claim 17, wherein the code further includes instructions to remove the key from the CAM that is identical to the one of the data keys found by one of the plurality of lookup engines.

* * * * *